(12) United States Patent
Hawrylyshen

(10) Patent No.: US 9,398,048 B2
(45) Date of Patent: Jul. 19, 2016

(54) AUTHENTICATING AN APPLICATION TO ACCESS A COMMUNICATION SYSTEM

(75) Inventor: Alan Hawrylyshen, Santa Cruz, CA (US)

(73) Assignee: Skype, Dublin (IE)

( * ) Notice: Subject to any disclaimer, the term of this patent is extended or adjusted under 35 U.S.C. 154(b) by 399 days.

(21) Appl. No.: 13/116,521

(22) Filed: May 26, 2011

(65) Prior Publication Data

US 2012/0304272 A1   Nov. 29, 2012

(51) Int. Cl.
H04L 29/06         (2006.01)

(52) U.S. Cl.
CPC .............. *H04L 63/168* (2013.01); *H04L 63/08* (2013.01); *H04L 2463/102* (2013.01)

(58) Field of Classification Search
None
See application file for complete search history.

(56) References Cited

U.S. PATENT DOCUMENTS

| | | | | |
|---|---|---|---|---|
| 7,194,004 | B1* | 3/2007 | Thomsen | 370/401 |
| 7,644,434 | B2* | 1/2010 | Pollutro | G06F 21/31 726/12 |
| 7,793,342 | B1* | 9/2010 | Ebrahimi | H04L 63/0281 713/166 |
| 2003/0046586 | A1* | 3/2003 | Bheemarasetti et al. | 713/201 |
| 2005/0015601 | A1* | 1/2005 | Tabi | 713/182 |
| 2005/0027820 | A1* | 2/2005 | O'Laughlen et al. | 709/217 |
| 2005/0177731 | A1 | 8/2005 | Torres et al. | |
| 2005/0216550 | A1* | 9/2005 | Paseman et al. | 709/202 |
| 2006/0230276 | A1* | 10/2006 | Nochta | G07F 7/08 713/176 |
| 2008/0034413 | A1* | 2/2008 | He | H04L 12/4641 726/9 |
| 2009/0055912 | A1* | 2/2009 | Choi et al. | 726/6 |
| 2009/0089581 | A1* | 4/2009 | Bishop et al. | 713/168 |
| 2009/0122968 | A1* | 5/2009 | Kutt | 379/93.05 |
| 2009/0138804 | A1* | 5/2009 | Shepherd et al. | 715/742 |
| 2011/0078437 | A1* | 3/2011 | Reddy | 713/155 |
| 2012/0005582 | A1* | 1/2012 | Webber et al. | 715/736 |

FOREIGN PATENT DOCUMENTS

| | | |
|---|---|---|
| CN | 101919225 | 12/2010 |
| EP | 2251810 | 11/2010 |
| EP | 2702715 | 3/2015 |

OTHER PUBLICATIONS

"International Search Report and Written Opinion", Application No. PCT/EP2012/059889, (Sep. 12, 2012), 10 pages.
"Foreign Office Action", CN Application No. 201280025452.4, Jun. 30, 2015, 16 pages.
Foreign Office Action, CN Application No. 201280025452.4, Feb. 22, 2016, 15 pages.

* cited by examiner

*Primary Examiner* — Lisa Lewis
*Assistant Examiner* — Henry Tsang
(74) *Attorney, Agent, or Firm* — Tom Wong; Micky Minhas

(57) ABSTRACT

Embodiments describe transmitting authentication data from an application to a communication system. The communication system verifies the authentication data transmitted from the application, and on the basis that the authentication data is verified, the communication system authenticates the application for accessing the communication system on behalf of a user. Prior to the transmitting step the authentication data is provided from the communication system to the client, and then from the client to the application. The verifying step comprises determining that the authentication data transmitted from the application corresponds to the authentication data provided from the communication system to the client, such that the application is authenticated for accessing the communication system on behalf of the user on the basis of the client's authentication with the communication system.

22 Claims, 7 Drawing Sheets

AUTHENTICATING AN APPLICATION TO ACCESS A COMMUNICATION SYSTEM

FIELD OF THE INVENTION

The present invention relates to accessing a communication system. In particular, the present invention relates to authentication of an application for accessing a communication system on behalf of a user.

BACKGROUND

User terminals, such as personal computers and mobile phones, execute various applications. One example of an application executed at a user terminal is a web browser with which a user terminal can access an internet and display data retrieved from an internet to a user on a display of the user terminal. The user terminal may be able to access networks other than an internet using other applications.

A user terminal may also be able to connect to a communication system. Data may be communicated throughout a communication system over a network such as an internet, such that the user terminal can connect to the communication system by connecting to an internet, e.g. using a modem. This allows the user terminal to communicate over the communication system. In order to communicate over a communications system a user may be required to authenticate to the communications system (or a delegate entity) by, for example, providing credentials such as a username and password.

The popularity of the Internet as a means of communication is currently increasingly rapidly. Using an internet as a means of communication may be beneficial to the user as this is often of significantly lower cost than using a telephone network (be it a fixed line or a mobile telephone network). This may particularly be the case for long-distance communication. The user of a user terminal may navigate to many different websites using a web browser on the user terminal. As the user navigates to particular websites a section of the user interface (UI) of the web browser may be designated for displaying data associated with a particular communication system. For example, an embedded object in the web browser UI may be for displaying data associated with the particular communication system, and may provide an interface for the user to access the particular communication system. However, in order for the web browser to access the communication system on behalf of the user the user is required to authenticate. For example, the user may enter his username and password into the web browser for authenticating the web browser to access the communication system on behalf of the user. Once the web browser is authenticated the user can use the web browser to communicate over the communication system or access details of his relationship with the communication system. Session identifiers are stored on a web server in the network such that the stateless HTTP protocol can support session state. The session identifier used by the web browser at the time of authentication of the web browser can be linked to the authentication of the web browser for accessing the communication system, such that the web browser is only authenticated for accessing the communication system for the particular session. In this way, the authentication of the web browser is limited in time. The session state information binds the web browser to the user and ensures that the communication system can associate the session to the appropriate data and resources. However, it can be frustrating and time consuming for the user to have to enter his authentication details for each session in which the web browser is to access the communication system. The user may therefore often decide not to authenticate, thereby preventing access to the communication system being provided in the web browser.

When a user joins a communication system he may enter various personal details and preferences. The user may also be associated in the communication system with a number of friends or "contacts"—interrelationships between communication system users. Once the web browser is authenticated by the communication system, then the UI of the web browser may display data retrieved from the communication system relating to the user, or to the user's contacts in the communication system. It can be important to ensure that the web browser is authenticated for accessing the communication system before displaying such data retrieved from the communication system. However, it may be desirable for this data to be retrieved without the user being required to enter his authentication details for each session in which the web browser is to access the communication system.

SUMMARY

The inventor of the present invention has realised that where a communication client is already authenticated for communicating on behalf of a user over a communication system, an application such as a web browser can be authenticated for accessing the communication system on behalf of the user on the basis of the client's authentication with the communication system. This realisation has led the inventor to invent a system in which a user does not necessarily have to enter details, such as his username and password, to a web browser for each session that the web browser is to access the communication system on behalf of the user.

Communication systems allow the user of a user terminal, such as a personal computer or a mobile phone, to communicate across a network such as the Internet. The user may install and execute client software associated with the communication system on his device in order to communicate over the communication system. The client software handles communication sessions over the communication system and may also provide other functions such as registration and authentication in the communication system. A communication session over the communication system may include any one or more of a voice call, a video call, a conference call, instant messaging ("IM"), voicemail and file transfer.

One example of a communication system uses a peer-to-peer ("P2P") topology built on proprietary protocols. To enable access to a peer-to-peer system, the user executes P2P client software provided by a P2P software provider on his computer, and registers with the P2P system. When the user registers with the P2P system the client software is provided with a digital certificate from a server. Once the client software has been provided with the certificate, communication can subsequently be set up and routed between users of the P2P system without the further use of a server.

According to a first aspect of the invention there is provided a method of authenticating an application for accessing a communication system on behalf of a user, wherein a communication client associated with the communication system is executed at a user terminal, usable by the user, and is authenticated for communicating over the communication system on behalf of the user, the method comprising: transmitting authentication data from the application to the communication system; the communication system verifying the authentication data transmitted from the application; and on the basis that the authentication data is verified, the communication system authenticating the application for accessing the communication system on behalf of the user, wherein prior to said transmitting step the authentication data is provided from the communication system to the client, and then from the client to the application, and wherein said verifying step comprises determining that the authentication data transmitted from the application corresponds to the authentication data provided from the communication system to the client, such that the application is authenticated for accessing the communication system on behalf of the user on the basis of the client's authentication with the communication system.

In preferred embodiments the application is executed at the user terminal. The client may provide the authentication data to the application by instructing an operating system at the user terminal to provide the authentication data to the application in accordance with user preferences stored by the operating system. In this way, the client does not need to be aware of the specific application, and the user's preferred way of using that application in order to implement the method described above. An instruction in a general form may be issued to the operating system, and it is the operating system that determines exactly which application to use and how to use it, e.g. in accordance with user preferences stored by the operating system.

In some other embodiments the application is executed at a further user terminal. Preferably, the client provides the authentication data to the application using a secure connection (or "link") between the user terminal and the further user terminal.

In preferred embodiments, the application is a web browser. The client may provide the authentication data to the web browser by providing a Uniform Resource Identifier (URI) including the authentication data to the web browser. The web browser may use the URI to access the communication system. In preferred embodiments, the web browser transmits a session identifier to the communication system and the authentication of the application comprises linking the session identifier to the authentication data to thereby authenticate the web browser for accessing the communication system on behalf of the user to the extent that the web browser uses the session identifier. The method may further comprise, following authentication of the web browser, displaying data from the communication system to the user in an embedded object in a user interface of the web browser.

The client may perform a predetermined transformation on the authentication data received from the communication system before providing the authentication data to the application, such that the authentication data transmitted from the application to the communication system is in a predetermined transformed state. The communication system may ascertain the predetermined transformation as part of determining that the authentication data transmitted from the application corresponds to the authentication data provided from the communication system to the client. Alternatively, the authentication data may be provided from the client to the application in the same state as the authentication data provided from the communication system to the client.

The authentication data that is provided from the communication system to the client may also be stored in a store of the communication system, and the determination that the authentication data transmitted from the application corresponds to the authentication data provided from the communication system to the client may comprise determining that the authentication data transmitted from the application corresponds to the authentication data stored in the store. The authentication data may be deleted from the store after a predetermined time period from storing the authentication data in the store. The predetermined time period may be between 1 second and 10 seconds. That is to say, the validity of the authentication data may be time limited. The validity of the authentication data may also be use or source-limited (for example used only 1 time or used from only a specified 'origin', or a combination thereof—these are implementation choices).

The verifying and authenticating steps may be performed by a server of the communication system. The method may comprise automatically initiating execution of the application responsive to the authentication data being provided from the communication system to the client if the application is not already being executed.

According to a second aspect of the invention there is provided a communication system for authenticating an application for accessing the communication system on behalf of a user, the communication system comprising: providing means for providing authentication data to a communication client associated with the communication system executed at a user terminal, usable by the user, the client being authenticated for communicating over the communication system on behalf of the user; receiving means for receiving authentication data from the application; verifying means for verifying the authentication data received from the application by determining that the authentication data received from the application at said receiving means corresponds to the authentication data provided from said providing means to the client; and authenticating means for authenticating the application, on the basis that the authentication data is verified, for accessing the communication system on behalf of the user, such that the application can be authenticated for accessing the communication system on behalf of the user on the basis of the client's authentication with the communication system.

According to a third aspect of the invention there is provided a method of authenticating an application for accessing a communication system on behalf of a user, the method comprising: providing authentication data to a communication client associated with the communication system executed at a user terminal, usable by the user, the client being authenticated for communicating over the communication system on behalf of the user; receiving authentication data from the application; verifying the authentication data received from the application by determining that the authentication data received from the application at said receiving means corresponds to the authentication data provided from said providing means to the client; and authenticating the application, on the basis that the authentication data is verified, for accessing the communication system on behalf of the user, such that the application is authenticated for accessing the communication system on behalf of the user on the basis of the client's authentication with the communication system.

According to a fourth aspect of the invention there is provided a user terminal, usable by a user, configured to authenticate an application for accessing a communication system on behalf of the user, the user terminal being configured to execute the application and a communication client, the communication client being associated with the communication system and being authenticated for communicating over the communication system on behalf of the user, the user terminal comprising: receiving means for receiving authentication data provided to the client from the communication system; means for providing the received authentication data from the client to the application; and transmitting means for transmitting the authentication data from the application to the communication system, such that the application can be authenticated by the communication system for accessing the communication system on behalf of the user on the basis of the client's authentication with the communication system.

According to a fifth aspect of the invention there is provided a method of authenticating an application for accessing a communication system on behalf of a user, wherein the application and a communication client are executed on a user terminal, usable by the user, the communication client being associated with the communication system and being authenticated for communicating over the communication system on behalf of the user, the method comprising: receiving authentication data provided to the client from the communication system; providing the received authentication data from the client to the application; and transmitting the authentication data from the application to the communication system, such that the application is authenticated by the communication system for accessing the communication system on behalf of the user on the basis of the client's authentication with the communication system.

The inventors have realised that by authenticating the application for accessing the communication system on the basis of the authentication of the client, the user does not have to provide authentication details to the application every time he wishes to access the communication system using the application.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Preferred embodiments of the invention will now be described by way of example only.

Figure 1:
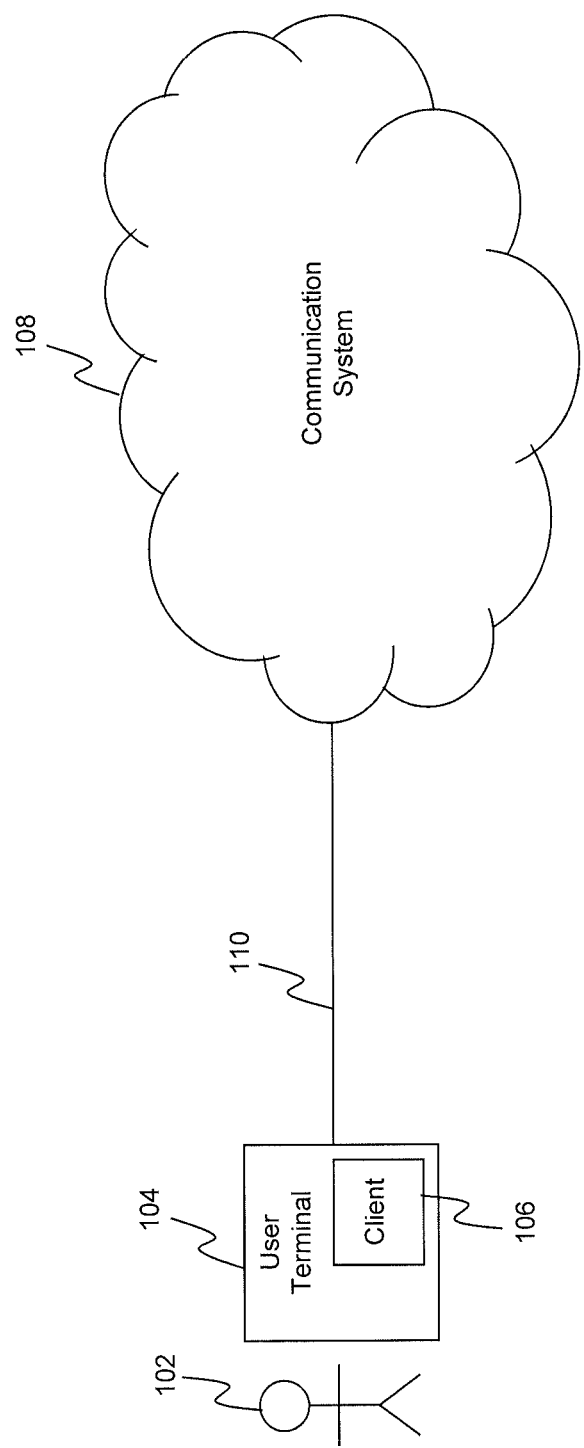
FIG. 1 shows a representation of a communication system and a user terminal according to a preferred embodiment.

Reference is first made to FIG. 1, which illustrates a communication system 108 connected to a user terminal 104 according to a preferred embodiment. A user 102 operates the user terminal 104. The user terminal 104 may be, for example, a mobile phone, a personal digital assistant ("PDA"), a personal computer ("PC") (including, for example, Windows™, Mac OS™ and Linux™ PCs), a gaming device or other embedded device able to communicate with the communication system 108. The user terminal 104 is arranged to receive information from and output information to the user 102 of the device. In a preferred embodiment the user terminal 104 comprises a display such as a screen and an input device such as a keyboard, mouse, touch-screen, keypad, joystick and/or microphone.

The user terminal 104 is configured to execute a communication client 106, provided by a software provider associated with the communication system 108. The communication client 106 is a software program executed on a local processor in the user terminal 104 which allows the user terminal 104 to engage in calls and other communication sessions (e.g. instant messaging communication sessions) over the communication system 108. The user terminal 104 is connected to the communication system 108 via a connection 110. For example, the communication system 108 may be a packet-based communication system in which data can be communicated between user terminals (and/or servers) over a network, such as an internet. Where the network of the communication system 108 is an internet, the connection 110 connects the user terminal to an internet, for example, via a modem. The connection 110 could comprise a wired connection and/or a wireless connection, such as a WiFi connection. Where the user terminal 104 is a mobile telephone, the connection 110 could be routed through a mobile telephone network to a gateway between the mobile telephone network and an internet. Many different methods for connecting a user terminal to a network such as an internet are known in the art, and the skilled person would realise that the user terminal 104 could be connected to the communication system 108 using any suitable known type of connection 110. Data can be transmitted between the user terminal 104 and the communication system 108 in both directions to thereby allow the user terminal to communicate with other nodes (e.g. other user terminals or servers) in the communication system 108. There may be many user terminals connected to the communication system 108, but for clarity only user terminal 104 is shown in FIG. 1.

Figure 2:
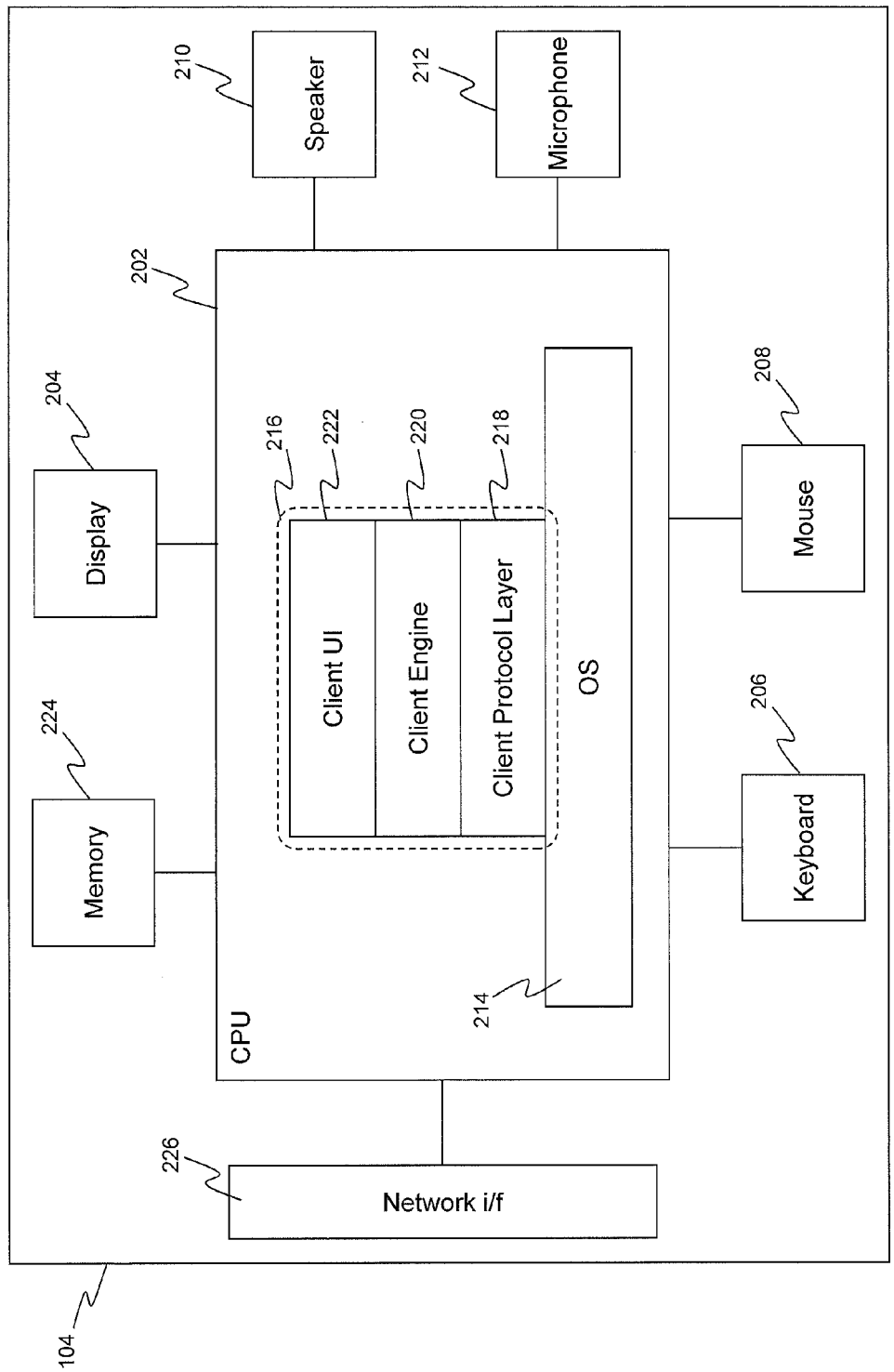
FIG. 2 shows a schematic diagram of a user terminal according to a preferred embodiment.

FIG. 2 illustrates a detailed view of the user terminal 104 on which is executed client 106. The user terminal 104 comprises a central processing unit ("CPU") 202, to which is connected a display 204 such as a screen, input devices such as a keyboard (or a keypad) 206 and a pointing device such as a mouse (or joystick) 208. The display 204 may comprise a touch screen for inputting data to the CPU 202. An output audio device 210 (e.g. a speaker) and an input audio device 212 (e.g. a microphone) are connected to the CPU 202. The display 204, keyboard 206, mouse 208, output audio device 210 and input audio device 212 are integrated into the user terminal 104. In alternative user terminals one or more of the display 204, the keyboard 206, the mouse 208, the output audio device 210 and the input audio device 212 may not be integrated into the user terminal 104 and may be connected to the CPU 202 via respective interfaces. One example of such an interface is a USB interface. The CPU 202 is connected to a network interface 226 such as a modem for communication with the network of the communication system 108. The network interface 226 may be integrated into the user terminal 104 as shown in FIG. 2. In alternative user terminals the network interface 226 is not integrated into the user terminal 104.

FIG. 2 also illustrates an operating system ("OS") 214 executed on the CPU 202. Running on top of the OS 214 is a software stack 216 for the client 106. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 226. The client protocol layer 218 of the client software communicates with the operating system 214 and manages the connections over the communication system 100. Processes requiring higher level processing are passed to the client engine layer 220. The client engine 220 also communicates with the client user interface layer 222. The client engine 220 may be arranged to control the client user interface layer 222 to present information to the user via a user interface of the client and to receive information from the user via the user interface.

Figure 3:
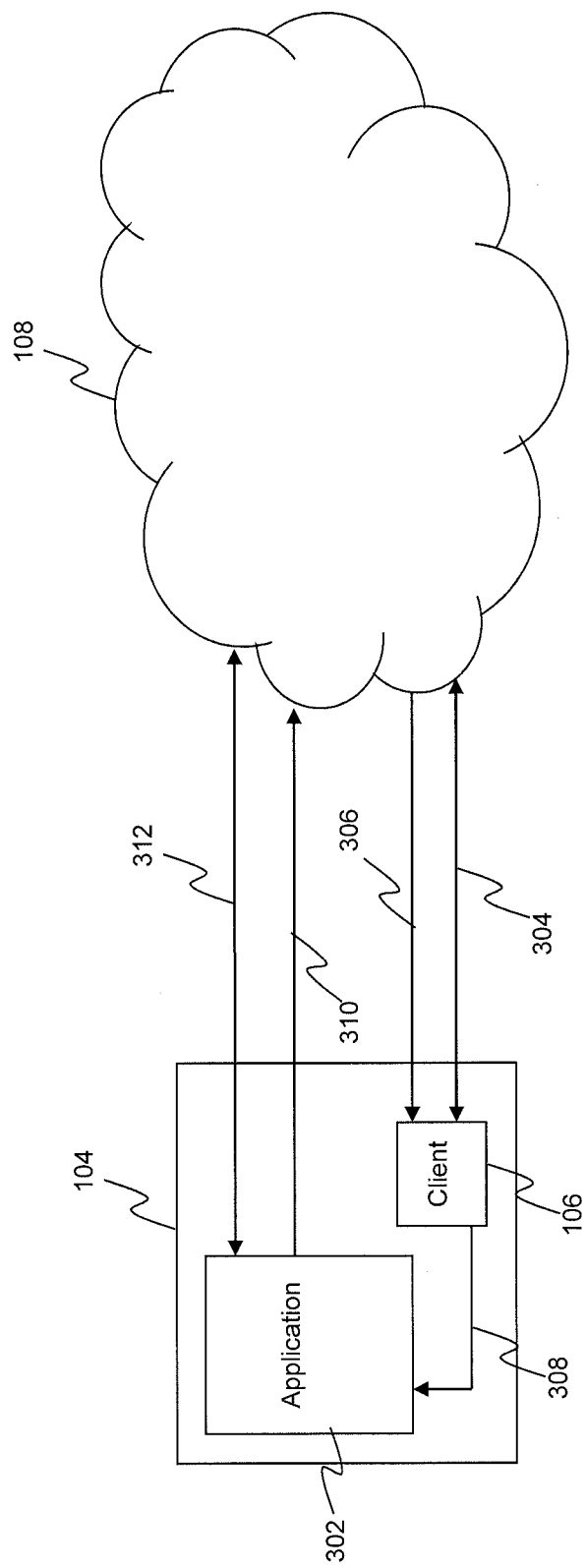
FIG. 3 shows a functional representation of a user terminal and a communication system according to a preferred embodiment.
Figure 4:
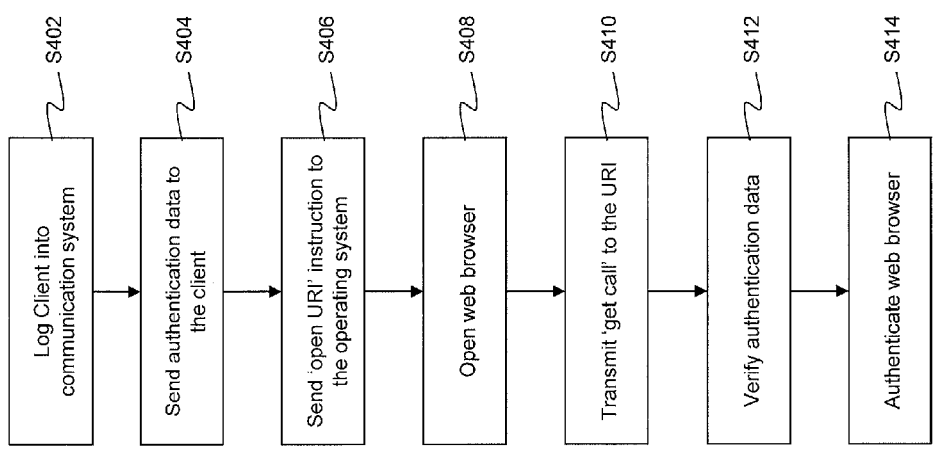
FIG. 4 is a flow chart for a process of authenticating an application according to a preferred embodiment.

With reference to FIGS. 3 and 4 there is now described a method of authenticating an application for accessing the communication system 108. FIG. 3 shows a functional representation of the user terminal 104 and the communication system 108 according to a preferred embodiment, and FIG. 4 is a flow chart for a process of authenticating an application according to a preferred embodiment. As shown in FIG. 3 the user terminal 104 executes the client 106 and an application 302. In the preferred embodiment described herein the application 302 is a web browser, but the application could be any application which can be executed at the user terminal 104 and which can communicate with the communication system 108. The web browser 302 and the client 106 are executed on the CPU 202 of the user terminal 104. The client 106 is associated with the communication system 108 in the sense that it is provided by a software provider of the communication system 108. The primary function of the client 106 is to communicate with the communication system 108. On the other hand, the application 302 is a general purpose application (e.g. a web browser). The application is not associated with the communication system 108 in the sense that it is provided by a software provider which is not associated with the communication system 108. The primary function of the application 302 is something other than communicating over the communication system 108. For example, where the application 302 is a web browser then its primary function is to communicate with an internet, rather than specifically with the communication system 108. The application 302 is independent from the client 106.

In step S402 the client 106 logs into the communication system 108. In this way, the client 106 is authenticated for accessing the communication system 108 and for communicating over the communication system 108. In order for the client 106 to log into the communication system the user 102 enters details such as a username and password (these details may be stored on the user terminal 104 and automatically entered to the client 106 when the client 106 is initiated). The details of the user 102 are stored in the communication system 108, such that the details entered by the user 102 can be checked against the stored details, and if they match then the client is authenticated for accessing, and communicating over, the communication system 108. The mechanism for authenticating the client 106 is known in the art and is not described in full here. The result of the authentication is that the client 106 can communicate over the communication system 108 on behalf of the user 102. A user account including details of the user 102 may be stored in the communication system 108, which may include the contact details of user 102's friends, or "contacts", in the communication system 108. In this way, when the client 106 logs into the communication system 108 on behalf of the user 102, the details stored in the user's account can be retrieved by the client 106 and used by the user 102 at the user terminal 104 for communicating over the communication system 108 e.g. with his contacts. The authentication of the client 106 is shown in FIG. 3 by the communication path 304.

After the client 106 has been authenticated in step S402 then that authentication can be used to authenticate the application 302 for accessing the communication system 108, as described below. In step S404 authentication data is sent from the communication system 108 to the client 106. This is shown in FIG. 3 by the communication path 306.

Step S404 may be performed at the same time as authenticating the client in step S402. Alternatively, step S404 may be performed in response to a request sent from the client 106 to the communication system 108 for the application 302 to be authenticated. Such a request may be transmitted, for example, when the user 102 instructs the client 106 to send the request or when the application 302 is initiated at the user terminal 104. The authentication data does not carry any information. Instead the authentication data can be considered to be a code, whose sole purpose is that of verifying that subsequently received authentication data matches (or corresponds with) the authentication data sent from the communication system to the client 106. Since the authentication data carries no information per se, unwanted interception of the authentication data does not in itself provide any information to the interceptor. This helps to maintain the security of the system.

The authentication data is stored at the communication system 108, such that the communication system 108 keeps a record of the authentication data provided to the client 106 in step S404.

The client 106 then provides the authentication data to the application 302, as depicting by communication path 308 in FIG. 3. The client may provide the authentication data directly to the application 302, e.g. the web browser. However, in the preferred embodiment shown in the method of FIG. 4, in step S406 the client 106 sends an 'open URI' instruction to the operating system 214 executing on the CPU 202. The URI includes the authentication data and identifies a remote resource such as an internet address. The address identified by the URI may be that of a server associated with the communication system 108. For example, the communication system 108 may be the Skype™ communication system and the URI may identify a resource hosted by Skype Ltd, such as www.skype.com, and may also include the authentication data, such that, as an example, the URI may have a form similar to www.skype.com/ . . . /f(authentication_data). The function, f(authentication_data), applied to the authentication data is a predetermined transformation function which is known by both the client 106 and the communication system 108 for transforming the authentication data into a predetermined transformed state. Although the function may alter the values which are used to represent the authentication data, both the client 106 and the communication system 108 will recognise the result of the function f(authentication_data) as being the authentication data. The only difference is that the authentication data is in a predetermined transformed state. In one simple example, the function, f, is simply be the identity function, such that the values of the authentication data supplied in the URI (as a result of using the function f(authentication_data)) are the same as those received from the communication system 108 in step S404. In other words, when the function, f, is the identity function the authentication data provided to the application 302 is in the same state as the authentication data provided from the communication system 108 to the client 106.

In step S408 the operating system 214 opens the application 302 (e.g. the web browser). If the application 302 is open prior to step S408 then there is no need to re-open the application 302, and instead the already open instance of the application 302 may be used. On receipt of the 'open URI' instruction received at the operating system from the client 106, the operating system determines how such instructions are to be handled according to the user preferences stored by the operating system. For example, the operating system may determine that a particular web browser is to be used to implement the 'open URI' instruction on the basis that this web browser has been identified by the user 102 as being the default web browser for use in accessing an internet. The operating system 214 can then instruct the web browser to navigate to the URI. By allowing the operating system 214 to determine which specific application is used to navigate to the URI the method is better matched to the user's preferences, without requiring the client 106 to determine those user preferences. When the web browser 302 is not already open when the client 106 sends the 'open URI' instruction to the operating system 214 then the web browser 302 may be opened automatically in order to handle the 'open URI' instruction.

In step S410 the web browser 302 transmits a 'GET request' for the web resource indicated by the URI specified by the client 106 in step S406. Since the URI includes the authentication data, this step involves transmitting the authentication data from the web browser 302 to the communication system 108. This step is shown in FIG. 3 by the communication path 310.

In preferred embodiments the URI identifies a server of the communication system 108 and so the authentication data in the URI (which may or may not be in a transformed state depending on the nature of the function f) is sent to a server of the communication system 108 in step S410. In step S412 the communication system 108 (and more specifically in the preferred embodiments, the web server of the communication system 108 which receives the authentication data from the application 302) verifies the authentication data received from the application 302. In order to verify the authentication data received from the application 302, the communication system 108 determines that the received authentication data corresponds to the authentication data sent to the client 106 in step S404. This determination involves retrieving the authentication data stored at the communication system 108 (which was stored when the authentication data was sent to the client in step S404) and verifying that the authentication data received from the application in step S410 corresponds to the stored authentication data.

Since the client 106 may perform a transformation on the authentication data as described above, the authentication data received in step S410 may not be in the same state as the authentication data transmitted to the client 106 in step S404. However, the communication system 108 can determine the transformation function, f, that was applied by the client 106 to the authentication data in order to determine whether the authentication data received from the application 302 corresponds to the authentication stored at the communication system 108. The communication system 108 can determine the transformation either by instructing the client 106 to use a particular transformation function, f, or by receiving an indication from the client 106 as to the particular transformation function, f, that the client 106 uses to transform the authentication data.

In step S414 the communication system 108 (and more specifically in the preferred embodiments, the web server of the communication system 108 which receives the authentication data from the application 302) authenticates the application 302 for accessing the communication system 108 on behalf of the user 102. The authentication of the application 302 is depicted in FIG. 3 by the communication path 312.

Where the application 302 is a web browser, the web browser 302 accesses an internet in sessions, which are limited in time as described above. The session ID of the particular session in which the web browser is operating when the 'GET request' is transmitted to the communication system 108 in step S410 is linked to the authentication of the web browser 302 such that the web browser 302 is only authenticated to access the communication system 108 on behalf of the user 102 to the extent that the web browser 302 is operating with the same session ID. In this way the authentication of the web browser 302 is temporary. This helps to improve the security of the system, since when the session ends, the web browser 302 is no longer authenticated to access the communication system 108 on behalf of the user 102.

Once the web browser 302 has been authenticated according to the method shown in FIG. 4 then the web browser 302 can retrieve data from the user's account with the communication system 108 and can display such data in a user interface of the web browser 302, e.g. on the display 204. An embedded object in a webpage may be used at the web browser 302 for allowing the web browser 302 to access, and communicate with, the communication system 108. As well as displaying data retrieved from the communication system 108, the web browser 302, once authenticated, can be used to allow the user 102 to engage in communication sessions over the communication system 108. The mechanism for communicating over the communication system 108 using the web browser 302 is similar to that of communicating over the communication system 108 using the client 106, except that the user interface of the web browser 302 is used, rather than that of the client 106, to provide an interface to the user 102.

Figure 5:
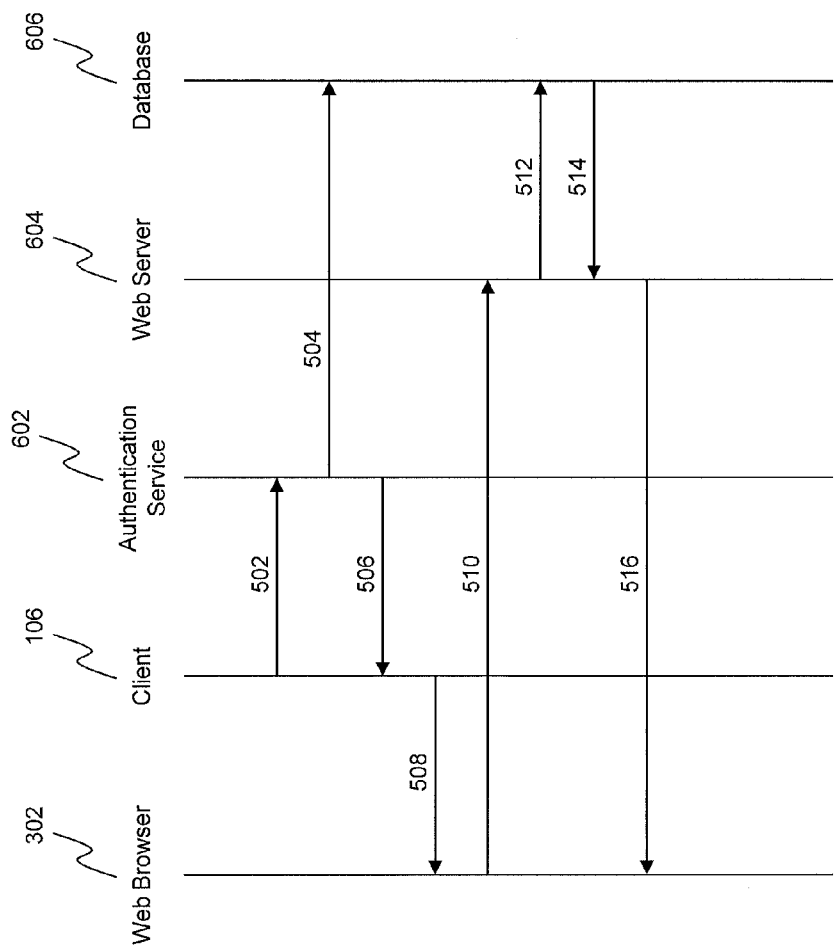
FIG. 5 is a timing diagram of the steps performed in a process of authenticating an application.
Figure 6:
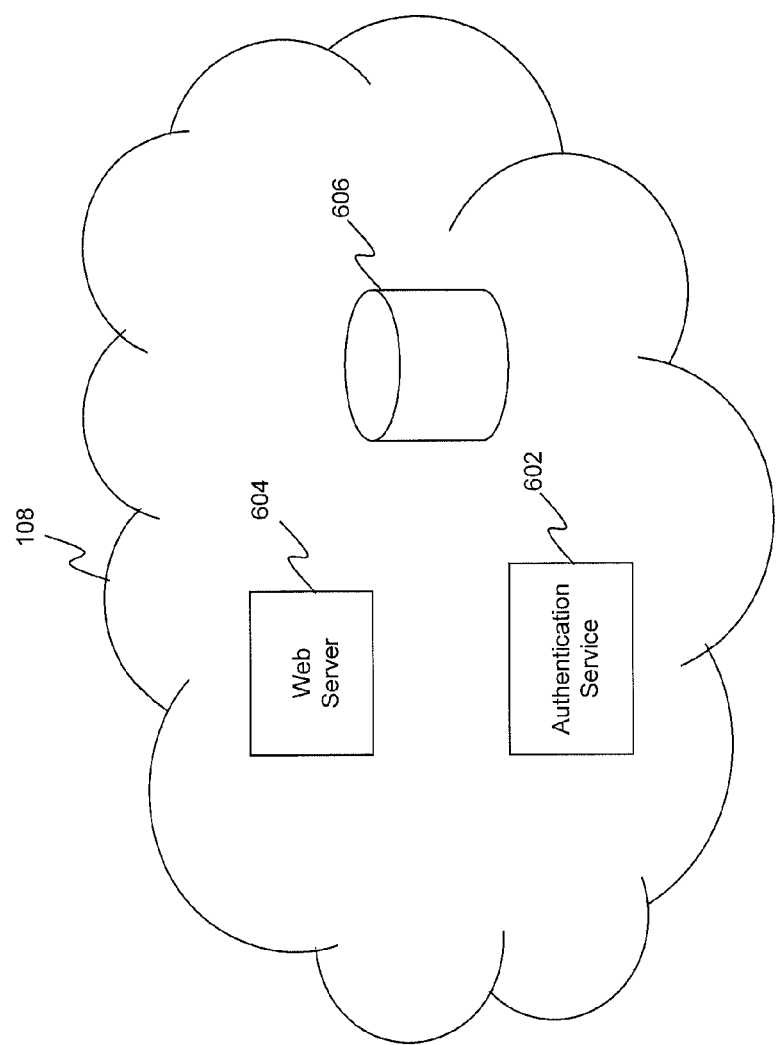
FIG. 6 shows elements within the communication system according to a preferred embodiment.

With reference to FIGS. 5 and 6 there is now provided a more detailed description of how the communication system 108 authenticates the application 302 in the method described above.

As shown in FIG. 6, the communication system 108 comprises an authentication service 602, a web server 604 and a store such as a database 606. The client 106 is authenticated to communicate over the communication system 108 on behalf of the user 102 prior to the steps shown in the timing diagram of FIG. 5. The client 106 sends a request 502 for authentication data to the authentication service 602 for authenticating the application 302 to access the communication system 108 on behalf of the user 102.

The authentication service 602 generates the authentication data and sends the authentication data (as shown by 504) to the database 606 for storage therein. The authentication service 506 also transmits the authentication data to the client 106 as shown by 506 in FIG. 5. The client 106 provides the authentication data to the web browser 302 (as shown by 508) as described above, e.g. by instructing the operating system 214 to open a URI including the authentication data such that the operating system 214 opens the web browser 302. As shown by 510, the web browser 302 sends the authentication data to the web server 604 of the communication system 108. In preferred embodiments, the address of the web server 604 is indicated by the URI. As shown by 512, the web server 604 queries the database 606 for the authentication data stored therein in step 504, and in response 514 the database 606 provides an acknowledgement that the authentication data is stored therein (or not stored therein as the case may be). On the basis of a positive acknowledgement from the database 606 the web server 604 can confirm (i.e. verify) that the authentication data received from the web browser 302 corresponds to that stored in the database 606 and, as shown by 516 can send an acknowledgement to the web browser 302 to indicate to the web browser 302 that it is authenticated for accessing, and communicating over, the communication system 108 on behalf of the user 102. On the other hand, if a negative acknowledgment is received from the database 606 in step 514 then the web server 604 does not authenticate the web browser 302 for accessing the communication system 108 on behalf of the user 102.

As an added security measure, to significantly reduce the likelihood of an application successfully randomly guessing data which corresponds to authentication data stored in the database 606, the authentication data is deleted from the database 606 after a predetermined time period following storage of the authentication data in the database 606 in step 504. The duration of the predetermined time period may be tuned in dependence upon conditions in the communication system. For example, the tuning may be a balancing act between the number of outstanding instances of authentication data (or "tokens"), the total entropy in each token and the percentage of the entropy space that is covered by the outstanding tokens—and therefore the probability that a third party could guess a token.

Therefore the authentication data is only stored in the database 606 for a short period of time. The authentication data is deleted from the database 606 after a period of time in which it is expected that the application 302 will be authenticated. By storing the authentication data in the database 606 for a limited amount of time, the security of the system is improved.

In summary of the method described above, the communication system can hand a TOKEN to the client software after authentication of the user. Some activity can take place with this TOKEN that will permit the web browser to be authenticated as the same user on the communication service via the web interface. This can be thought of as leveraging standards. A URL is dispatched to the OS, causing the user-preferred handler to process (load) it. This act binds the web browser to the user's account on the communication system, but now through the http session (effectively pairing the two). Possession of the TOKEN is considered authentication. Therefore secure transport of the TOKEN, along with expiring the TOKEN is useful for an implementation to be resistant to fraud or attacks.

Figure 7:
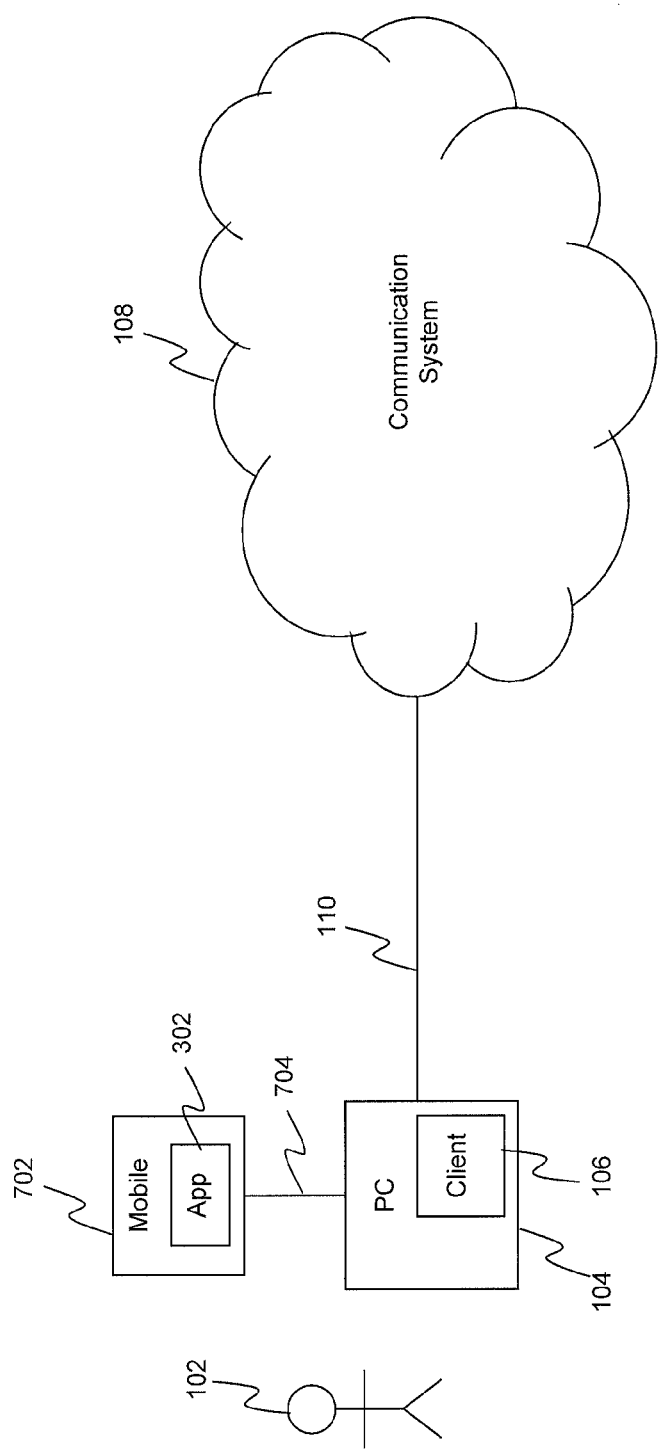
FIG. 7 shows a representation of a communication system, a user terminal and a further user terminal according to an alternative embodiment.

In the preferred embodiments described above, the application 302 and the client 106 are both executed at the user terminal 104. In alternative embodiments, the application 302 is executed on a device which is separate to the user terminal 104. As shown in FIG. 7, the application 302 could be executed on a mobile phone 702 associated with the user 102, whilst the client 106 is executed on a personal computer (PC) 104 associated with the user 102. The mobile phone 702 can communicate with the PC 104 over a secure connection 704. The connection 704 may be a wired connection or a wireless connection, such as a Bluetooth or infra-red connection, as is known in the art.

The security of the connection 704 is important so that the communication system 108 can trust that the passage of the authentication data from the communication system 108, to the client 106, to the application 302 and back to the communication system 108 is secure. The connection, or "link", 704 can be secured using any known mechanism. For example, where the connection 704 is a Bluetooth connection, the user 102 may be required to enter a password when establishing the connection 704 between the mobile phone 702 and the PC 104, thereby authenticating the connection 704, and providing the requisite security in the connection 704.

Since the connection 704 is secure, the communication system 108 can authenticate the application 304 for accessing the communication system 108 on behalf of the user 102 on the basis of the client's authentication. If the connection 704 was not secure the communication system 108 would have less trust in authenticating the application 304 on the basis of the client's authentication.

In the preferred embodiments described above in which both the client 106 and the application 302 are executed at the same user terminal 104 then the connection between the client 106 and the application 302 is more trusted (i.e. is considered more secure) than when the application 302 and client 106 are executed at different user terminals (e.g. 104 and 702). The system shown in FIG. 7 is can be used provided there is a reasonably secure mechanism to transfer the token/URI from one authenticated element to another, leveraging the local knowledge that both devices/interfaces are under the control of a single user. The invention could be implemented in any suitable system in which this is this is the case.

As would be apparent to one skilled in the art, in order to perform the method steps described above which are performed at the user terminal 104, a computer program product may be provided at the user terminal 104 for execution on the CPU 202, the computer program product comprising computer-readable instructions for carrying out the method steps. Similarly, in order to perform the method steps described above which are performed at the communication system 108, a computer program product may be provided for execution at the communication system 108, the computer program product comprising computer-readable instructions for carrying out the method steps.

While this invention has been particularly shown and described with reference to preferred embodiments, it will be understood to those skilled in the art that various changes in form and detail may be made without departing from the scope of the invention as defined by the appendant claims.

The invention claimed is:

1. A method comprising:
receiving, at a web browser executed at a user terminal, authentication data from a communication client executed at the user terminal, the communication client authenticated to communicate over a communication system on behalf of a user, the communication client associated with the communication system, and the web browser not associated with the communication system, the authentication data comprising a code, wherein, prior to providing the authentication data to the web browser, the communication client applies a predetermined transformation function to the authentication data to transform the authentication data into a transformed state, the communication client providing the authentication data to the web browser by instructing an operating system of the user terminal to provide the authentication data to the web browser in accordance with user preferences stored by the operating system, the user preferences identifying the web browser as a default web browser;
transmitting the authentication data, in the transformed state, from the web browser to the communication system; and
receiving, at the web browser, authentication to access the communication system if the communication system verifies that the authentication data corresponds to authentication data previously received by the communication client from the communication system, the authentication authenticating the web browser to communicate over the communication system on behalf of the user and without the user providing authentication details to the web browser, the predetermined transformation function known by both the communication client and the communication system.

2. The method of claim 1 wherein the web browser is executed at the user terminal.

3. The method of claim 1 wherein the web browser is executed at a further user terminal.

4. The method of claim 3 wherein the communication client provides the authentication data to the web browser using a secure connection between the user terminal and the further user terminal.

5. The method of claim 1 wherein the communication client provides the authentication data to the web browser by providing a Uniform Resource Identifier including the authentication data to the web browser.

6. The method of claim 5 wherein said transmitting further comprises the web browser using said Uniform Resource Identifier to access the communication system.

7. The method of claim 5 wherein the Uniform Resource Identifier identifies a resource associated with the communication system.

8. The method of claim 1 further comprising:
following authentication of the web browser, displaying data from the communication system to the user in an embedded object in a user interface of the web browser.

9. The method of claim 1, wherein the authentication data received from the client at the web browser is in the same state as the authentication data received from the communication system at the communication client.

10. The method of claim 1 wherein the authentication data received from the communication system at the client is also stored in a store of the communication system, and wherein said causing the communication system to verify the authentication data comprises causing the communication system to determine that the authentication data transmitted from the application corresponds to the authentication data stored in the store.

11. The method of claim 10 wherein the authentication data is configured to be deleted from the store after a predetermined time period from when the authentication data is stored in the store.

12. The method of claim 11 wherein the duration of the predetermined time period is tuned in dependence upon conditions in the communication system.

13. The method of claim 1, wherein the web browser is automatically executed responsive to the authentication data being received at the communication client from the communication system.

14. The method of claim 1 wherein the predetermined transformation function comprises an identity function.

15. A communication system comprising:
one or more computing devices; and
one or more memories comprising instructions stored thereon that, responsive to execution by the one or more computing devices, perform operations comprising:
providing authentication data to a communication client associated with the communication system executed at a user terminal, the communication client authenticated to communicate over the communication system on behalf of a user, the providing causing the communication client to provide the authentication data to an application executed at the user terminal that is not associated with the communication system, the authentication data comprising a code, the communication client providing the authentication data to the application by instructing an operating system of the user terminal to provide the authentication data to the application in accordance with user preferences stored by the operating system, the user preferences identifying the application as a default web browser;
receiving authentication data, in a transformed state, from the application executed at the user terminal;
verifying the authentication data received from the application by using a predetermined transformation function to recognize the authentication data, and determining that the authentication data received from the application corresponds to the authentication data provided to the client; and
authenticating the application for accessing the communication system on behalf of the user responsive to verifying the authentication data.

16. The communication system of claim 15 further comprising a store for storing the authentication data that is provided to the client, and wherein said determining further comprises determining that the authentication data received from the application corresponds to the authentication data stored in the store.

17. The communication system of claim 15 wherein said verifying and said authenticating is performed at a server.

18. A method comprising:
providing authentication data to a communication client associated with a communication system executed at a user terminal, the communication client authenticated to communicate over the communication system on behalf of a user, the providing causing the communication client to provide the authentication data to an application executed at the user terminal that is not associated with the communication system, the authentication data comprising a code, the communication client providing the authentication data to the application by instructing an operating system of the user terminal to provide the authentication data to the application in accordance with user preferences stored by the operating system, the user preferences identifying the application as a default web browser;
receiving authentication data and a session identifier from the application executed at the user terminal;
verifying the authentication data received from the application by determining that the authentication data received from the application corresponds to the authentication data provided to the client; and
authenticating the application for accessing the communication system on behalf of the user responsive to verifying the authentication data, the authenticating linking the session identifier to the authentication data to enable the application to access the communication system on behalf of the user using the session identifier.

19. A computer storage device comprising instructions stored thereon that, responsive to execution by a processor, perform operations comprising:
providing authentication data to a communication client associated with a communication system executed at a user terminal, the communication client authenticated to communicate over the communication system on behalf of a user, the providing causing the communication client to provide the authentication data to an application executed at the user terminal that is not associated with the communication system, the authentication data comprising a code, the communication client providing the authentication data to the application by instructing an operating system of the user terminal to provide the authentication data to the application in accordance with user preferences stored by the operating system, the user preferences identifying the application as a default web browser;
receiving authentication data, in a transformed state, from the application executed at the user terminal;
verifying the authentication data received from the application by using a predetermined transformation function to recognize the authentication data, and determining that the authentication data received from the application corresponds to the authentication data provided to the client; and authenticating the application for accessing the communication system on behalf of the user responsive to verifying the authentication data.

20. A user terminal comprising:

one or more processors;

a memory comprising instructions stored thereon that, responsive to execution by the one or more processors, perform operations comprising:

receiving, at an application executed at the user terminal, authentication data from a communication client executed at the user terminal, the communication client authenticated to communicate over a communication system on behalf of a user, the communication client associated with the communication system, and the application not associated with the communication system, the authentication data comprising a code, the communication client providing the authentication data to the application by instructing an operating system of the user terminal to provide the authentication data to the application in accordance with user preferences stored by the operating system, the user preferences identifying the application as a default web browser;

transmitting the authentication data and a session identifier to the communication system; and receiving, at the application, authentication to access the communication system if the communication system verifies that the authentication data corresponds to authentication data previously received by the communication client from the communication system, the authentication authenticating the application to communicate over the communication system on behalf of the user, and the authentication linking the session identifier to the authentication data to enable the application to access the communication system on behalf of the user using the session identifier.

21. A communication system comprising:

one or more computing devices; and one or more memories comprising instructions stored thereon that, responsive to execution by the one or more computing devices, perform operations comprising:

receiving, at an application executed at a user terminal, authentication data from a communication client executed at the user terminal, the communication client authenticated to communicate over a communication system on behalf of a user, the communication client associated with the communication system, and the application not associated with the communication system, wherein, prior to providing the authentication data to the application, the communication client applies a predetermined transformation function to the authentication data to transform the authentication data into a transformed state, the communication client providing the authentication data to the application by instructing an operating system of the user terminal to provide the authentication data to the application in accordance with user preferences stored by the operating system, the user preferences identifying the application as a default web browser;

transmitting the authentication data, in the transformed state, to the communication system; and receiving, at the application, authentication to access the communication system if the communication system verifies that the authentication data corresponds to authentication data previously received by the communication client from the communication system, the authentication authenticating the application to communicate over the communication system on behalf of the user, the predetermined transformation function known by both the communication client and the communication system.

22. A computer readable storage device comprising instructions stored thereon that, responsive to execution by one or more processors, perform operations comprising:

receiving, at an application executed at a user terminal, authentication data, in a transformed state, from a communication client executed at the user terminal, the communication client authenticated to communicate over a communication system on behalf of a user, the communication client associated with the communication system, and the application not associated with the communication system, the authentication data comprising a code, the communication client providing the authentication data to the application by instructing an operating system of the user terminal to provide the authentication data to the application in accordance with user preferences stored by the operating system, the user preferences identifying the application as a default web browser;

transmitting the authentication data, in the transformed state, to the communication system; and receiving, at the application, authentication to access the communication system if the communication system verifies that the authentication data corresponds to authentication data previously received by the communication client from the communication system, the authentication authenticating the application to communicate over the communication system on behalf of the user, wherein a predetermined transformation function used by the communication client to transform the authentication data into the predetermined transformed state is known by both the communication client and the communication system.

* * * * *